US012606239B2

(12) United States Patent　　　　(10) Patent No.: US 12,606,239 B2
Subramanian　　　　　　　　　　　(45) Date of Patent: Apr. 21, 2026

(54) SYSTEM AND METHOD FOR DYNAMIC ACKERMAN CONTROL

(71) Applicants: VOLVO TRUCK CORPORATION, Gothenburg (SE); Chidambaram Subramanian, Greensboro, NC (US)

(72) Inventor: Chidambaram Subramanian, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 45 days.

(21) Appl. No.: 18/546,212

(22) PCT Filed: Mar. 17, 2021

(86) PCT No.: PCT/US2021/022837
　§ 371 (c)(1),
　(2) Date: Aug. 11, 2023

(87) PCT Pub. No.: WO2022/197298
　PCT Pub. Date: Sep. 22, 2022

(65) Prior Publication Data
　US 2024/0116565 A1　　Apr. 11, 2024

(51) Int. Cl.
　B62D 6/00　　　(2006.01)
　B62D 7/09　　　(2006.01)
　B62D 7/14　　　(2006.01)
(52) U.S. Cl.
　CPC ............. B62D 6/002 (2013.01); B62D 6/007 (2013.01); B62D 7/09 (2013.01); *B60Y 2200/148* (2013.01); *B62D 7/144* (2013.01)
(58) Field of Classification Search
　CPC .......... B62D 6/002; B62D 6/007; B62D 7/09; B62D 7/144; B62D 7/15; B62D 7/159; B60Y 2200/148

(Continued)

(56) References Cited

U.S. PATENT DOCUMENTS

| 2017/0282971 A1 | 10/2017 | Yanez |
| 2019/0248411 A1 | 8/2019 | Peng et al. |

FOREIGN PATENT DOCUMENTS

| CN | 109664937 A | 4/2019 |
| WO | 2006122622 A1 | 11/2006 |

(Continued)

OTHER PUBLICATIONS

International Search Report and Written Opinion of the International Searching Authority in corresponding International Application No. PCT/US2021/022837 mailed Dec. 1, 2021 (10 pages).

*Primary Examiner* — Mark L. Greene
(74) *Attorney, Agent, or Firm* — Jeffri A. Kaminski; Venable LLP

(57) ABSTRACT

Systems, methods, and computer-readable storage media for a dynamic Ackermann geometry control system. The system receives, at a processor aboard a tractor of an articulated vehicle, vehicle information associated with ongoing movement of the articulated vehicle as well as a driver optimization preference. The system then executes an Ackermann control algorithm, with inputs such as the vehicle information and/or at least one feedback item. The outputs of the Ackermann control algorithm can include estimations of tire forces for each tire of the articulated vehicle and estimations of cornering characteristics of the articulated vehicle. The system then calculates, based on the estimations of tire forces and based on the estimations of cornering characteristics, a desired Ackermann geometry for the articulated vehicle. The system then transmits a command to modify a turning angle associated with at least one wheel of the articulated vehicle.

20 Claims, 5 Drawing Sheets

(58) Field of Classification Search
USPC ..................................................... 280/93.506
See application file for complete search history.

(56)                    References Cited

FOREIGN PATENT DOCUMENTS

| | | | |
|---|---|---|---|
| WO | 2009019444 | A1 | 2/2009 |
| WO | 2015060752 | A1 | 4/2015 |
| WO | 2020142829 | A1 | 7/2020 |
| WO | 2020249185 | A1 | 12/2020 |

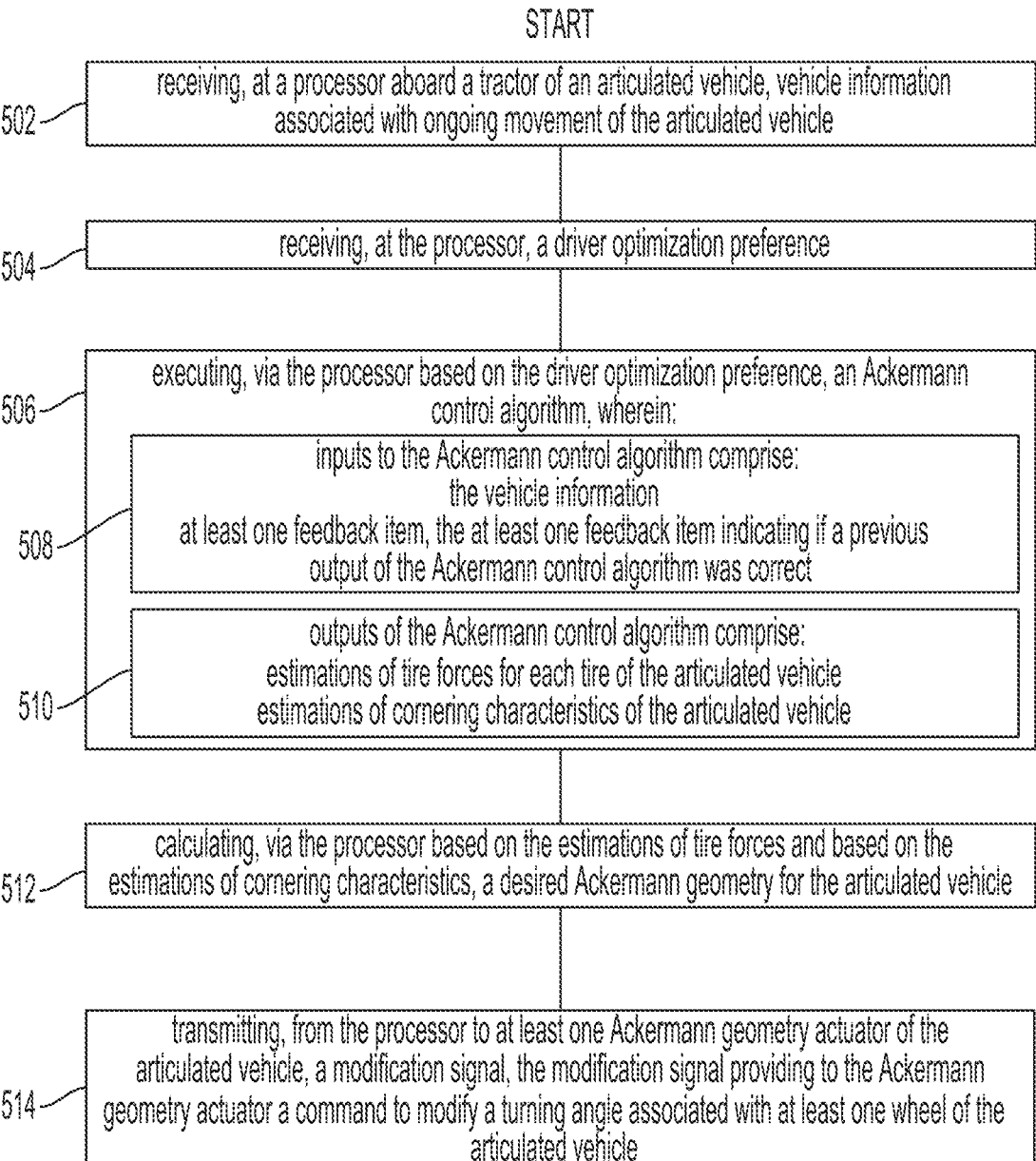

START

502 — receiving, at a processor aboard a tractor of an articulated vehicle, vehicle information associated with ongoing movement of the articulated vehicle 504 — receiving, at the processor, a driver optimization preference 506 — executing, via the processor based on the driver optimization preference, an Ackermann control algorithm, wherein:

508 — inputs to the Ackermann control algorithm comprise:
the vehicle information
at least one feedback item, the at least one feedback item indicating if a previous output of the Ackermann control algorithm was correct 510 — outputs of the Ackermann control algorithm comprise:
estimations of tire forces for each tire of the articulated vehicle
estimations of cornering characteristics of the articulated vehicle 512 — calculating, via the processor based on the estimations of tire forces and based on the estimations of cornering characteristics, a desired Ackermann geometry for the articulated vehicle 514 — transmitting, from the processor to at least one Ackermann geometry actuator of the articulated vehicle, a modification signal, the modification signal providing to the Ackermann geometry actuator a command to modify a turning angle associated with at least one wheel of the articulated vehicle

END

FIG. 5

SYSTEM AND METHOD FOR DYNAMIC ACKERMAN CONTROL

CROSS-REFERENCE TO RELATED APPLICATIONS

This application is a U.S. National Stage application of PCT/US2021/022837, filed Mar. 17, 2021 and published on Sep. 22, 2022, as WO 2022/197298, all of which is hereby incorporated by reference in its entirety.

BACKGROUND

1. Technical Field

The present disclosure relates to Ackermann geometry of a vehicle, and more specifically to using neural networks to determine when and how to adjust the Ackermann geometry of the vehicle.

2. Introduction

Modern vehicles have superior control systems in the chassis in order to improve the performance and safety of the vehicle. One mechanism for doing so is Ackermann steering geometry, which modifies the turning angles of wheels of a vehicle on the inside and outside of a turn, such that the wheels trace out circles of distinct radii. In practical terms, this can mean that a vehicle's inside/outside wheels turn to different angles with respect to the vehicle chassis, rather than being parallel to one another. Modifications to Ackermann steering geometry are unlike modifications to a vehicle's common steering geometry, such as camber and toe-in of the wheel or tire, which manipulate the angle of the wheel's vertical alignment with respect to the surface being traversed. Modifications to Ackermann steering geometry are also unlike changes to the caster of a wheel or tire, which change the forward/backward slope of a line drawn through the upper and lower steering pivot points.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a processor aboard a tractor of an articulated vehicle, vehicle information associated with ongoing movement of the articulated vehicle; receiving, at the processor, a driver optimization preference; executing, via the processor based on the driver optimization preference, an Ackermann control algorithm, wherein: inputs to the Ackermann control algorithm comprise: the vehicle information; and at least one feedback item, the at least one feedback item indicating if a previous output of the Ackermann control algorithm was correct; and outputs of the Ackermann control algorithm comprise: estimations of tire forces for each tire of the articulated vehicle; and estimations of cornering characteristics of the articulated vehicle; calculating, via the processor based on the estimations of tire forces and based on the estimations of cornering characteristics, a desired Ackermann geometry for the articulated vehicle; and transmitting, from the processor to at least one Ackermann geometry actuator of the articulated vehicle, a modification signal, the modification signal providing to the Ackermann geometry actuator a command to modify a turning angle associated with at least one wheel of the articulated vehicle.

An articulated vehicle configured to perform the concepts disclosed herein can include: articulated vehicle comprising: a tractor vehicle; a trailer vehicle; at least one Ackermann geometry actuator; a processor; and a non-transitory computer-readable storage medium having instructions stored which, when executed by the processor, cause the processor to perform operations comprising: receiving vehicle information associated with ongoing movement of the articulated vehicle; receiving a driver optimization preference; executing, based on the driver optimization preference, an Ackermann control algorithm, wherein: inputs to the Ackermann control algorithm comprise: the vehicle information; and at least one feedback item, the at least one feedback item indicating if a previous output of the Ackermann control algorithm was correct; and outputs of the Ackermann control algorithm comprise: estimations of tire forces for each tire of the articulated vehicle; and estimations of cornering characteristics of the articulated vehicle; calculating, based on the estimations of tire forces and based on the estimations of cornering characteristics, a desired Ackermann geometry for the articulated vehicle; and transmitting, to the at least one Ackermann geometry actuator of the articulated vehicle, a modification signal, the modification signal providing to the Ackermann geometry actuator a command to modify a turning angle associated with at least one wheel of the articulated vehicle.

A non-transitory computer-readable storage medium configured as disclosed herein can have instructions stored which, when executed by a computing device, cause the computing device to perform operations which include: receiving vehicle information associated with ongoing movement of the articulated vehicle; receiving a driver optimization preference; executing, based on the driver optimization preference, an Ackermann control algorithm, wherein: inputs to the Ackermann control algorithm comprise: the vehicle information; and at least one feedback item, the at least one feedback item indicating if a previous output of the Ackermann control algorithm was correct; and outputs of the Ackermann control algorithm comprise: estimations of tire forces for each tire of the articulated vehicle; and estimations of cornering characteristics of the articulated vehicle; calculating, based on the estimations of tire forces and based on the estimations of cornering characteristics, a desired Ackermann geometry for the articulated vehicle; and transmitting, to the at least one Ackermann geometry actuator of the articulated vehicle, a modification signal, the modification signal providing to the Ackermann geometry actuator a command to modify a turning angle associated with at least one wheel of the articulated vehicle.

BRIEF DESCRIPTION OF THE DRAWINGS

FIG. 5 illustrates an example method embodiment; and

DETAILED DESCRIPTION

Figure 1:
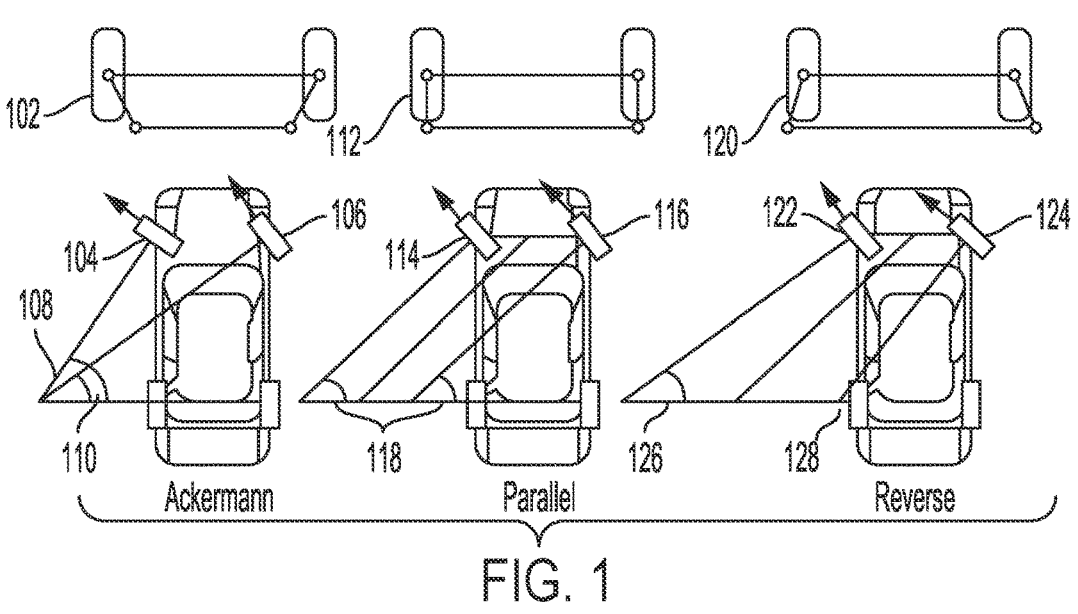
FIG. 1 illustrates examples of Ackermann geometry, parallel geometry, and Reverse Ackermann geometry.

Various embodiments of the disclosure are described in detail below. While specific implementations are described, it should be understood that this is done for illustration purposes only. Other components and configurations may be used without parting from the spirit and scope of the disclosure.

Performance of a vehicle (in terms of fuel economy, vehicle stability, and/or tire wear) can vary based on the Ackermann geometry, which can be tuned for a specific application, driver behavior, and/or a specific driving cycle (such as maneuvering style and/or braking style). To obtain a desired performance, the Ackermann geometry values for a vehicle can vary based on the driver, where the vehicle is operating, and what the vehicle is being used for.

Disclosed herein are various examples and embodiments for a dynamic Ackermann control system which varies the Ackermann geometry of a vehicle based on a vehicle's drive cycle, the driver's driving style, and/or the route being travelled. The dynamic Ackermann control system uses a combination of neural networks and/or reinforcement learning to predict the best turning angles of different wheels of the vehicle to meet a desired vehicle performance, and can send signals to actuators within the vehicle to adjust those turning angles. In some cases, the adjustment to the turning angles can require modifying the range a tire can turn and/or the rate at which the tire turns based on inputs from the steering wheel.

Consider the following example: As a delivery driver delivers products from a distribution center to residential neighborhoods, they drive from the distribution center, enter a highway, then enter a neighborhood. In each of these different locations, the truck may change surfaces (e.g., concrete to asphalt) and/or driving conditions (slow crawl with multiple turns at the distribution center, fast and straight on a highway, stop and go traffic after exiting the highway but before reaching the neighborhood, tight turns in the neighborhood). For optimal comfort, fuel efficiency, tire wear, performance, or other desired vehicle applications, each of the conditions through which the truck will pass could have distinct Ackermann geometries, based on particular location or circumstances. In addition, how the driver operates the vehicle, the route being driven, the turning radii of turns required by the vehicle, and/or the driver's driving style or tendencies, could affect the optimal Ackermann geometry for a given situation.

To determine the optimum Ackermann geometry for any given scenario, an artificial neural network can be created using known vehicle drive cycles, known driving styles, and known Ackermann geometries. This neural network can be converted to computer executable code as a machine learning model, then deployed on a vehicle. When in operation, the vehicle can execute a reinforcement learning model, where inputs from the vehicle (from vehicle sensors) can allow the reinforcement learning model to determine a current driving cycle of the vehicle and the application for which the vehicle is being used. The outputs of the reinforcement learning can be provided to the machine learning model to determine the optimum Ackermann geometry based on how the vehicle is currently being operated. In configurations where the vehicle is configured with actuators to self-modify Ackermann geometry components during operation, the optimum Ackermann geometry can result in various components being modified or changed by the actuators during vehicle operation. In configurations in which vehicles lack self-modification capabilities, the optimum Ackermann geometry can be communicated to a technician or other individual, who can then manually modify the Ackermann geometry.

The data from the vehicle, collected by the vehicle sensors, can include data regarding the vehicle velocity, vehicle acceleration, lateral acceleration data, yaw rate, steering angle, wheel speeds, throttle activation, brake pedal activation, axle load, position (via Global Positioning System (GPS)), suspension articulation data, tire pressure(s), road surface type over which the vehicle is currently traversing, and/or current steering input. Other exemplary data which can be collected could include slip data for the various wheels, braking capacity, angle of ascent/descent, general engine data, road conditions (wet, dry, icy, etc.), acceleration/deceleration patterns over a period of time, and/or any other data conveyed via the Controller Area Network (CAN) bus within a vehicle.

In configurations where the vehicle is an articulated vehicle, having a tractor and a trailer, the data collected from the tractor can be distinct from the data collected from the trailer. For example, while both the tractor and the trailer may report wheel speeds of the respective wheels, axle loads of respective axles, and/or lateral acceleration information, in some configurations the steering angle and yaw rate may only be obtained from the trailer. In other exemplary configurations, both the tractor and the trailer can provide the same data to the dynamic Ackermann system.

Yet additional data can include information on the route being travelled by the vehicle. In some cases, this information can be gathered based on previous routes the vehicle has travelled. For example, if a truck travels the same route(s) everyday, the system can identify (using, for example, GPS data recorded from previous trips) the radii of turns being travelled by the truck on that route. Alternatively, if a driver is driving a new route, and a navigation system (such as, but not limited to, GOOGLE MAPS or APPLE MAPS) has identified turn-by-turn instructions to arrive at a destination, the system can use data from the navigation system (and/or other databases) to determine road surfaces, speed limits, turning radii, etc., of the route to be travelled, and provide that information to the dynamic Ackermann control system. In such cases, if a first vehicle from an organization has travelled a particular route before, but a second vehicle in that organization has not, information about the route can be transmitted from the first vehicle to the second vehicle (directly or via an intermediary) for use with the dynamic Ackermann control systems disclosed herein.

Any combination of the collected vehicle data can be input into a reinforcement learning model executed by a processor of the vehicle. The reinforcement learning model can also be a neural network, configured in a similar to other neural networks described herein. One example output of the reinforcement learning model can be a driving cycle of the vehicle, such as "transient" (where the vehicle is undergoing many changes, typical in stop and go traffic or off-roading), or "modal" (where the vehicle is going long periods of time at a constant speed). Another example output of the reinforcement learning model can be an application of the vehicle, such as if the vehicle is being used to transport goods, ferry passengers, drive in an urban environment, drive off-road, etc.

The outputs of the reinforcement learning model can be specific to the driver of the vehicle. For example, as the vehicle sensors collect data and the reinforcement learning model analyzes that data, the driver of the vehicle can confirm (or reject) the driving cycle and/or vehicle application of the vehicle. Over time, as the system collects additional data from the driver, the system can modify the reinforcement learning model such that the driving cycle/ vehicle application outputs are based on the feedback provided by the vehicle driver. In this manner, the reinforcement learning model adapts and self-modifies over time, producing more accurate predictions of the driving cycle and/or vehicle application. The system can also use GPS data, known road surface data, etc., to cross-check the feedback received by the vehicle driver.

The outputs of the reinforcement learning model can also be used as inputs to a machine learning model based on a neural network. Additional inputs to the machine learning model can also include the vehicle sensor data which was used as inputs to the reinforcement learning model. In some configurations, the vehicle sensor data input to the machine learning model can be identical to the inputs of the reinforcement learning model, whereas in other configurations the vehicle sensor data input to the machine learning model can be a portion or subset of the vehicle sensor data input to the inputs of the reinforcement learning model. In still other configurations, the vehicle sensor data input to the machine learning model can include vehicle data which was not used as an input to the reinforcement learning model. For instance, in some configurations, an additional input can include a driver (or other human being) preference on how the vehicle should be optimized. In such cases, the driver could indicate that they desire that the Ackermann geometry of the vehicle be configured to optimize the fuel economy of the vehicle. Other examples of driver preferences could be to minimize the wear on the tires (thereby optimizing tire wear), optimizing ride comfort, optimizing vehicle performance for a given scenario (such as optimizing for cornering versus optimizing for lack of cornering), or an overall optimization of fuel economy, tire wear, and performance. While in this example the system can be configured to take a single driver preference, in other configurations the inputs to the second machine learning model can also include multiple driver preferences, or ranked driver preferences.

The machine learning model can then output optimal Ackermann geometry values (such as the turning radius of each wheel on the vehicle, the rate each wheel should turn with respect to steering wheel input and/or other wheels, or if the wheels should default to a parallel configuration) based on the inputs provided to the machine learning model. In some circumstances, the machine learning model outputs values for all possible Ackermann geometry components on a given vehicle each time the algorithm is executed, whereas in other circumstances the algorithm only outputs Ackermann geometry values which vary from a current vehicle configuration. For example, if the maximum left turning angle, the maximum right turning angle, the left turn multiplier (for how fast a tire turns left compared to steering wheel input), and the right turn multiplier (for how fast a tire turns right compared to steering wheel input) correspond to all of the Ackermann geometry components for a given wheel of a vehicle, in some configurations the machine learning model may output values for each of these components each time the machine learning model is executed. In another configuration, the machine learning model may only output values where the optimum configuration varies from a current component configuration, such that even if there were many possible component values which could be output, only a portion of those have corresponding outputs at a given time.

Where the vehicle is equipped with actuators to adjust Ackermann steering components, the Ackermann components output of the machine learning model can be transmitted to one or more actuators corresponding to the respective output, such that the actuators adjust the vehicle's Ackermann geometry while the vehicle is in operation. In some configurations, where the vehicle is not configured to auto-adjust via actuators while operating, the outputs of the machine learning model can be presented to the driver or to a technician, who can then make manual adjustments to the vehicle at their judgment. Such output can, for example, be displayed on the vehicle dashboard, via a smartphone application, or by any other effective vehicle-to-human communication mechanism.

In configurations where the vehicle is configured to auto-adjust while operating, the outputs of the machine learning model can be provided to actuators and/or other control systems within the vehicle. The actuators can then adjust the vehicle components according to the adjustment values output by the machine learning model, and sensors can compare the adjusted component values to the optimal/ desired component values output by the machine learning model. If adjusted component values detected do not match the desired values output by the machine learning model additional adjustments may be necessary.

As an example of how to train the neural network which in turn is converted to executable code as a machine learning model, a vehicle manufacturer or other entity can collect known vehicle data (corresponding to the vehicle information and sensor data used as inputs to the reinforcement learning model, such as: lateral acceleration data, yaw rate, steering angle, vehicle velocity, wheel speeds, throttle, brake pedal depression, axle load data, GPS location, and/or suspension articulation data), for the vehicle. For articulated vehicles, the vehicle data may be for individual components (e.g., data recorded for the tractor alone, or for the trailer alone), data collected for the combined articulated vehicle (i.e., data collected when the tractor is coupled to the trailer), or the system can combine data from individual components (e.g., the tractor data and the trailer data) to form combined, articulated vehicle data. The vehicle data can be collected from multiple vehicles under multiple conditions, preferably with the amount of data collected from each vehicle being at least thirty minutes of operation, though the amount of data can vary.

In this example, (1) the known vehicle data, (2) the corresponding, known driving cycles, (3) the corresponding, known vehicle applications, and (4) known Ackermann component values, can be compared via a sensitivity analysis, resulting in correlations between (1) the known feature data, (2) the corresponding, known driving cycles, (3) the corresponding, known vehicle applications, and (4) known Ackermann geometry component values. For example, the sensitivity analysis can execute models (such as a one-at-a time test, a derivative-based local method, regression analysis, variance-based method, screening, scatter plots, etc.) to define how a given input/variable affects the likelihood of a specific condition (such as the X, Y, Z dimensions) in the Ackermann geometry being determined. More specifically, the system can receive the known vehicle sensor data collected, driving cycles, vehicle applications, and determine how they affect the known Ackermann geometries. The correlation outputs of the sensitivity analysis define the likelihood of a given variable affecting one or more of the Ackermann geometry components.

The outputs of the sensitivity analysis, as well the sensitivity analysis training data, can then be used to construct a neural network. For example, the correlations and test data associated with the sensitivity analysis can be input into Python, MatLab®, or other development software configured to construct neural network based on factor-specific data. Depending on the specific scenario, users can adjust the neural network construction by selecting from optimization methods including (but not limited to) the least-squares method, the Levenberg-Marquardt algorithm, the gradient descent method, or the Gauss-Newton method. The neural network can make predictions of the optimal Ackermann geometry given input variables corresponding to the same data which were used to train the neural network. The neural network can then be converted to machine code and uploaded into memory, where upon execution by a processor the neural network operates as a machine learning model.

With respect to the reinforcement learning model, the neural network can be configured in a similar manner. The initial data can be driving data from various driving conditions, such as mining, long-haul, street, refuse, etc. The data from these driving conditions are evaluated via sensitivity analysis, and the resulting correlations can be used to construct the neural network for the reinforcement learning model. After initial constructions, the reinforcement learning model can operate based on a reward system. For example, after a day of driving feedback from the driver can be collected. The system would ask the driver a question regarding the driving conditions of the day, then use the answers the driver provides to determine if the model is accurately predicting driving conditions. For example, the system may ask the driver if they drove on rough surfaces with hard turns and an average velocity of 10 kilometers/hour, which is what the system predicted occurred. If the driver answers yes, the system gets a "reward," meaning that the system further maintain the tune the model in a similar manner going forward. If the driver answers no, the system will tune the model in a different direction until the driver begins answering "True" or "Yes" to the questions presented. More specifically, the Yes/No or True/False answers to the questions can modify the weights and biases of the connections between the nodes in the reinforcement learning model neural network, where a yes/true can add weight to an existing connection, and a no/false can reduce weight of an existing connection. Questions can be presented to the drivers on a periodic basis (every day, every week, etc.), when a change in conditions is detected (e.g., a change from dirt to asphalt), and/or when a certain amount of time driving has occurred (e.g. every four hours of driving).

Articulated vehicles, as described herein, can include vehicles which have a tractor and a trailer coupled together, such as a semi-truck, a car pulling a boat, etc. With articulated vehicles there are generally at least three distinct axles (generally at least two for the tractor and at least one for the trailer), however in various configurations there could be two or more axles on each part of the articulated vehicle. In some configurations, there could be more than one trailer. The data provided to the system can include axle load information for each of the different axles within the articulated vehicle, as well as tire/wheel data associated with each wheel on the different axles. This information can, as described above, be used by the neural network/control algorithm to estimate tire forces of each tire on the articulated vehicle, as well as to estimate cornering characteristics of the articulated vehicle and the overall coupled system stability.

FIG. 1 illustrates examples of Ackermann geometry, parallel geometry, and Reverse Ackermann geometry. With a parallel wheel geometry 112, both wheels 114, 116 turn at the same rate to the same angle 118. To turn at the same angle 118, in geometric terms, the wheels are turning around different center points.

With Ackermann geometry 102, as illustrated, linkages within the steering of the car cause the wheels 104, 106, to turn around a common center point, which causes the angles 108, 110 of the wheels with respect to the center point to differ. As illustrated, with traditional Ackermann geometry, on a left turn, the left wheel 104 turns further to the left than the right wheel 106.

With reverse Ackermann geometry 120, as illustrated, linkages within the steering of the car cause the wheels 122, 124, to turn around a distinct center points, which causes the angles 126, 128 of the wheels with respect to the center point to differ. As illustrated, with reverse Ackermann geometry, on a left turn, the left wheel 122 turns less to the left than the right wheel 124.

Figure 2A:
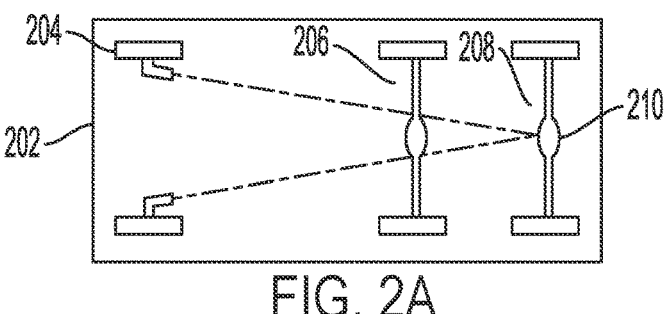
FIG. 2A illustrates a first example of Ackermann geometry for a multi-axle vehicle.

FIG. 2A illustrates a first example 202 of Ackermann geometry for a multi-axle vehicle, such as an articulated vehicle. In this example, the vehicle is configured to be in an ideal Ackermann configuration, with the front wheel 204 configured to pivot around a center point 210 near the rear axle 208. Other tires of the articulated vehicle are fixed, and do not pivot. When turning, this configuration results in higher drag from the tires of the center axle 206, with the result of higher wear on those tires. The system may, for example, select such a configuration when the axle load of the rear axle 208 is higher than the axle load of the middle axle 206, or where the middle axle 206 is a liftable axle, where no weight is placed on the axle. Where the middle axle 206 has a lighter load than the rear axle 208, by placing the center point 210 on the rear axle 208 the resulting tire wear on the tires of the middle axle 206 from lateral drag during turns will be less than if the center point 210 were on the middle axle 206 and the tires of the more heavily loaded rear axle 208 were dragging. Similarly, the system may avoid this configuration if the tires of the middle axle 206 are previously known to have excessive wear, in an attempt to lengthen the lifespan of the tires.

Figure 2B:
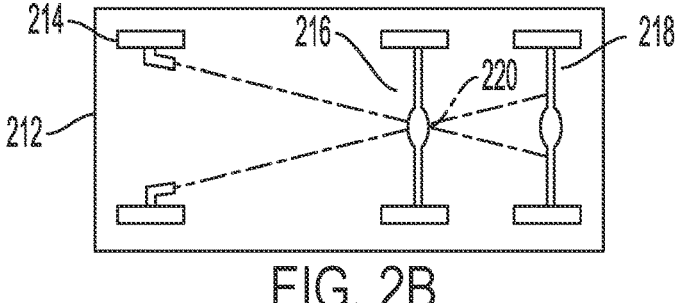
FIG. 2B illustrates a second example of Ackermann geometry for a multi-axle vehicle.

FIG. 2B illustrates a second example 212 of Ackermann geometry for a multi-axle vehicle. In this example, the vehicle is configured to be in a reverse Ackermann configuration, with the front wheel 214 configured to pivot around a center point 220 near the middle axle 216. Other tires of the articulated vehicle are fixed, and do not pivot. In this configuration, the Ackermann geometry results in less wear to the tires of the middle axle 216, and more wear to the tires of the rear axle.

Figure 2C:
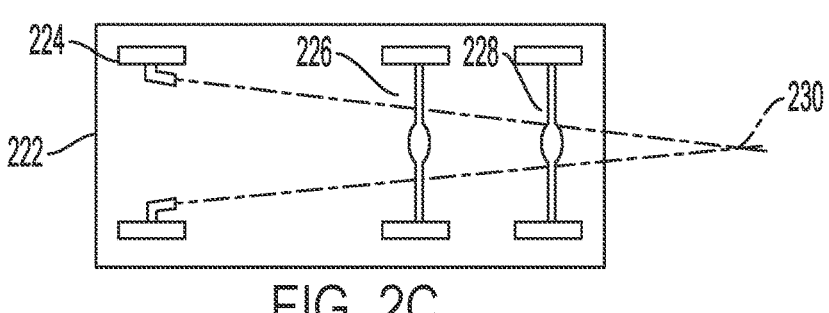
FIG. 2C illustrates a third example of Ackermann geometry for a multi-axle vehicle.

FIG. 2C illustrates a third example 222 of Ackermann geometry for a multi-axle vehicle. In this example, the vehicle is configured to be in near-parallel configuration, with the front wheel 224 configured to pivot around a center point 230 beyond the rear axle. Other tires 226, 228 of the articulated vehicle are fixed, and do not pivot. This configuration may, for example, be selected where the vehicle and/or driver is looking to ensure a higher level of stability when going through turns. For example, if the driver will be approaching a 45 degree turn at a relatively high speed, by adjusting the Ackermann geometry to have a center point 230 as illustrated, the outside tires are more heavily weighted, and the chances of a rollover are reduced.

While FIGS. 2A, 2B, and 2C illustrate the center points 210, 220, 230 as being at specific locations on the axles or beyond the axles, the system can vary the center points according to the axle loads, driver preferences, and/or other factors in determining Ackermann geometry. For example, looking at FIG. 2A, rather than having the center point 210 on the rear axle 208 or the middle axle 206, the system could set the center point 210 between middle and rear axles 206, 208, thereby distributing the drag/tire wear. In such configurations, the center points 210 could be set based on axle loads of the middle and rear axles 206, 208, with the goal of setting the Ackermann geometry to distribute tire wear equally between the two axles based on the respective loads and predicted turns/driving patterns. In other words, the location of the center points 210, 220, 230 can be set at any point required by the system, within the bounds of possible Ackermann geometry configurations.

While FIGS. 2A, 2B, and 2C illustrate examples of three axle vehicles, in some configurations the vehicle may have four or more axles. In such configurations, the system has additional inputs (such as axle location, axle loads, friction/traction of the respective tires, etc.) for those additional axles, and can make determinations of Ackermann geometry based on those additional inputs.

Figure 3:
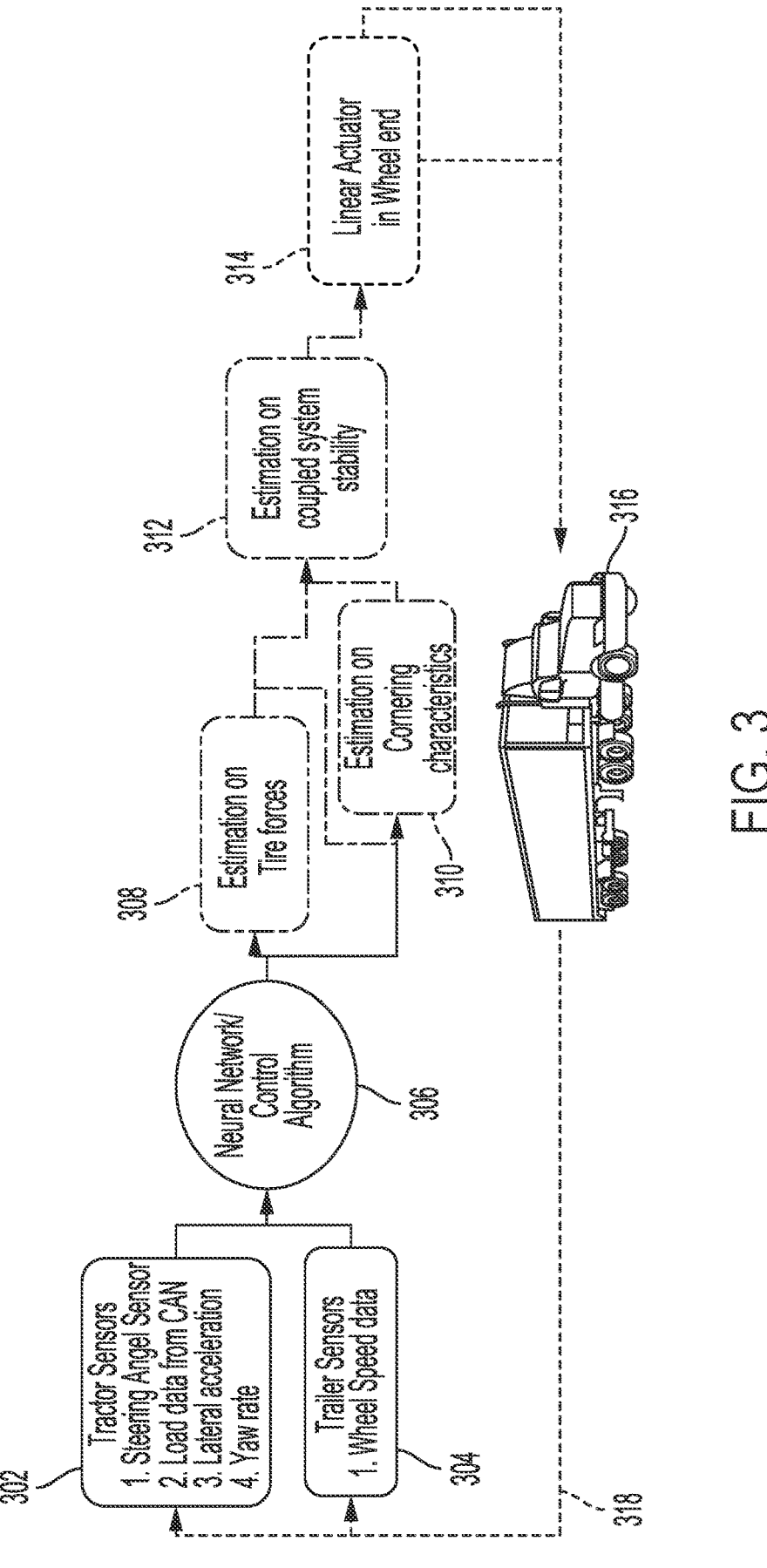
FIG. 3 illustrates an example of using a neural network to modify Ackermann geometry of a vehicle.

FIG. 3 illustrates an example of using a neural network 306 to modify Ackermann geometry of an articulated vehicle (such as a truck 316). The system collects tractor sensor data 302, which can include steering angle sensor data, load data from the CAN (Controller Area Network), lateral acceleration data, and the yaw rate. The system also collects trailer sensor data 304, which can include wheel speed data for the wheels of the trailer. This information is provided as inputs to the neural network/control algorithm 306 being executed within one or more processors of the articulated vehicle. The system outputs an estimation of the tire forces 308 on each tire, which can be used by the system to estimate cornering characteristics 310 of the articulated vehicle. The system uses the estimation of tire forces 308 and the estimation of corning characteristics 310 to estimate the coupled system stability 312 of the articulated vehicle 316, and signals a linear actuator within a wheel end 314 of the articulate vehicle 316 to adjust the Ackermann geometry of the wheel. Additional data 318 is then collected by the vehicle sensors 302, 304 as the process iteratively repeats.

Figure 4:
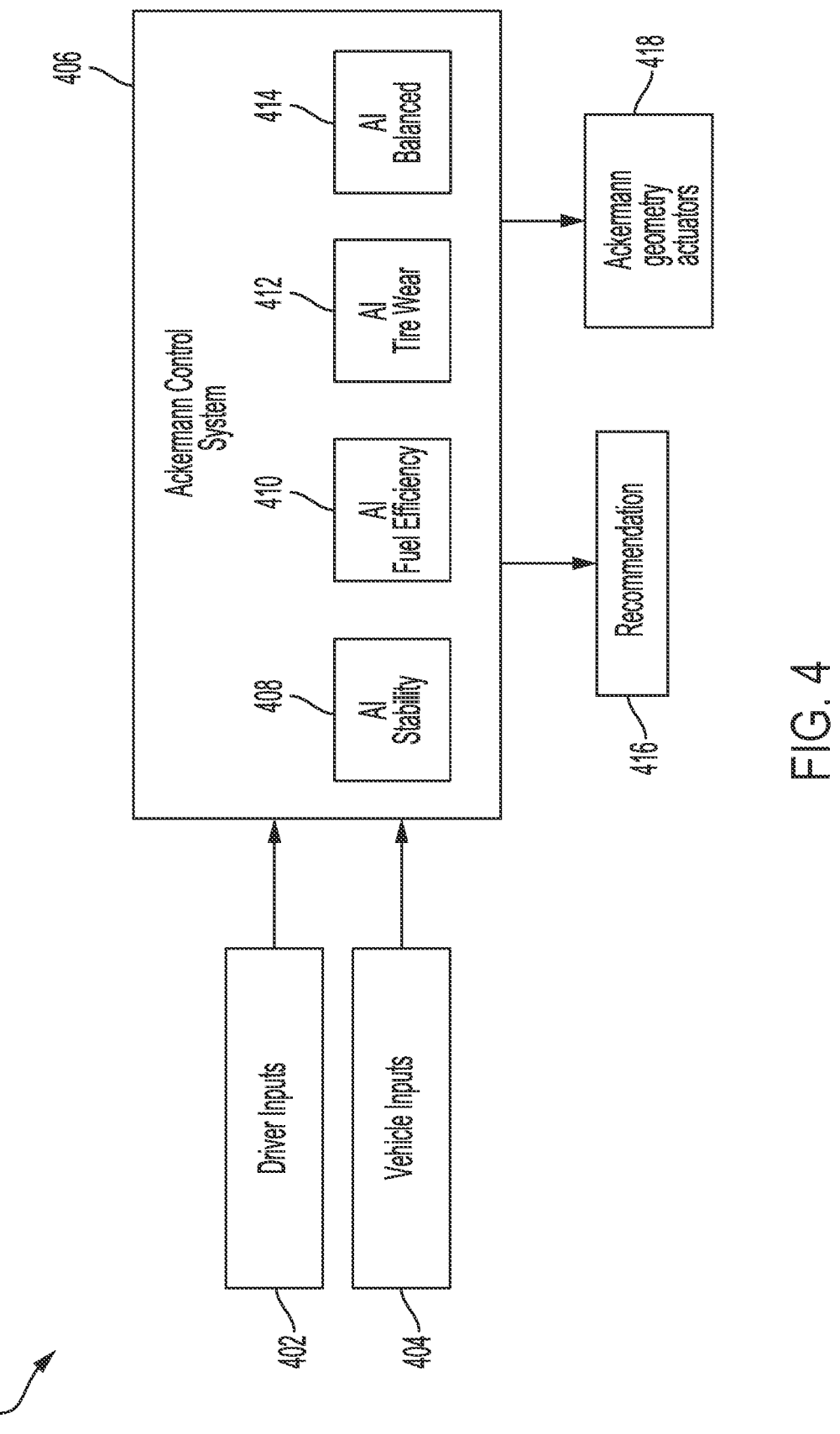
FIG. 4 illustrates an example of an Ackermann control system.

FIG. 4 illustrates an example 400 of an Ackermann control system 406. In this example, the driver (or other human being) can provide driver inputs 402 to the system 406, such as a preference to maximize stability, fuel efficiency, tire wear, and/or maximize a balance of stability, fuel efficiency, and tire wear. In some configurations, additional or fewer driver preferences may be available for selection. The system 406 can also receive vehicle inputs 404, such as sensor data from sensors within the vehicle. If the vehicle is an articulated vehicle, the data retrieved from the tractor sensors can be distinct from the data retrieved from the trailer sensors. Exemplary data can include data regarding the vehicle velocity, vehicle acceleration, lateral acceleration data, yaw rate, steering angle, wheel speeds, throttle activation, brake pedal activation, axle load, position (via Global Positioning System (GPS)), suspension articulation data, tire pressure(s), road surface type over which the vehicle is currently traversing, route data, traffic data, and/or current steering input. Other exemplary data which can be collected could include slip data for the various wheels, braking capacity, angle of ascent/descent, general engine data, road conditions (wet, dry, icy, etc.), acceleration/deceleration patterns over a period of time, and/or any other data conveyed via the Controller Area Network (CAN) bus within a vehicle.

The Ackermann control system 406 receives the driver and vehicle inputs 402, 404, and executes one or more artificial intelligence (AI) algorithms, developed using neural networks as disclosed above. As illustrated, the system can have distinct algorithms 408, 410, 412, 414 based on the driver's optimization preference. For example, if the driver has a stability preference, the system 406 can execute the AI stability 408 algorithm using the data received, and can similarly use distinct AI algorithms for fuel efficiency 410, tire wear 412, and a balanced approach 414. Regarding the balanced approach, the balanced AI algorithm 414 can seek to maximize the other options (illustrated as stability, fuel efficiency, and tire wear, but could include others), with the algorithm selecting an Ackermann configuration which provides the highest collective values across all of the potential factors. In all of the algorithms 408, 410, 412, 414, there may be a minimum "floor" to a given value. For example, while the AI fuel efficiency algorithm 410 may seek to optimize the Ackermann geometry for fuel efficiency, there may be a minimum required value of tire wear required. Such minimum values can be, for example, identified to meet safety standards.

If the vehicle where the Ackermann control system is operating is configured with actuators, the system 406 can output a signal to the Ackermann geometry actuators 418 to modify the Ackermann geometry of one or more wheels while the vehicle is operating. If the vehicle is not equipped with actuators, the system 406 can output a recommendation 416 to the driver, a mechanic, or other individuals who can determine if a manual modification to the Ackermann geometry is needed.

FIG. 5 illustrates an example method embodiment which can be executed by a system. As illustrated, the system can receive, at a processor aboard a tractor of an articulated vehicle, vehicle information associated with ongoing movement of the articulated vehicle (502). The system can also receive, at the processor, a driver optimization preference (504) and execute, via the processor based on the driver optimization preference, an Ackermann control algorithm (506). The inputs to the Ackermann control algorithm can comprise: the vehicle information; and at least one feedback item, the at least one feedback item indicating if a previous output of the Ackermann control algorithm was correct (508). The outputs to the Ackermann control algorithm can comprise estimations of tire forces for each tire of the articulated vehicle; and estimations of cornering characteristics of the articulated vehicle (510). The system can then calculate, via the processor based on the estimations of tire forces and based on the estimations of cornering characteristics, a desired Ackermann geometry for the articulated vehicle (512). The system can then transmit, from the processor to at least one Ackermann geometry actuator of the articulated vehicle, a modification signal, the modification signal providing to the Ackermann geometry actuator a command to modify a turning angle associated with at least one wheel of the articulated vehicle (514).

In some configurations, the estimations of tire forces for each tire of the articulated vehicle further include: estimations of front axle tire forces for each tire on a front axle of the articulated vehicle; estimations of rear axle tire forces for each tire on a rear axle of the articulated vehicle; and estimations of intermediate axle tire forces for each tire on at least one axle of the articulated vehicle located between the front axle and the rear axle.

In some configurations, the Ackermann control algorithm executed can be one of a plurality of Ackermann control algorithms available for execution by the processor, and the method can further include selecting the Ackermann control algorithm from the plurality of Ackermann control algorithms based on the driver optimization preference. In such configurations, the plurality of Ackermann control algorithms can include: a stability-focused algorithm; a fuel efficiency-focused algorithm; a tire wear-focused algorithm; and a balance of stability, fuel efficiency, and tire wear algorithm.

In some configurations, the vehicle information can include: wheel speeds of the articulated vehicle; a steering angle of the articulated vehicle; load data of a front axle of the articulated vehicle; load data of a rear axle of the articulated vehicle; load data of each of each axle of the articulated vehicle located between the front axle and the rear axle; lateral acceleration of the articulated vehicle; and a yaw rate of the articulated vehicle.

In some configurations, the Ackermann control algorithm can be generated by: performing a sensitivity analysis which identifies correlations between known values of vehicle data associated with the articulated vehicle information, known values of Ackermann geometry components, known driving cycles, and known vehicle applications; forming, via a computing device, a neural network using the correlations; and converting, via the computing device, the neural network to computer executable code, resulting in the Ackermann control algorithm.

In some configurations, the at least one feedback item can include an indication of accuracy from a driver of the articulated vehicle regarding previous outputs of the Ackermann control algorithm.

In some configurations, the modification signal modifies a first wheel to have a first turning angle and a second wheel to have a second turning angle, where the first turning angle is distinct from the second turning angle.

Figure 6:
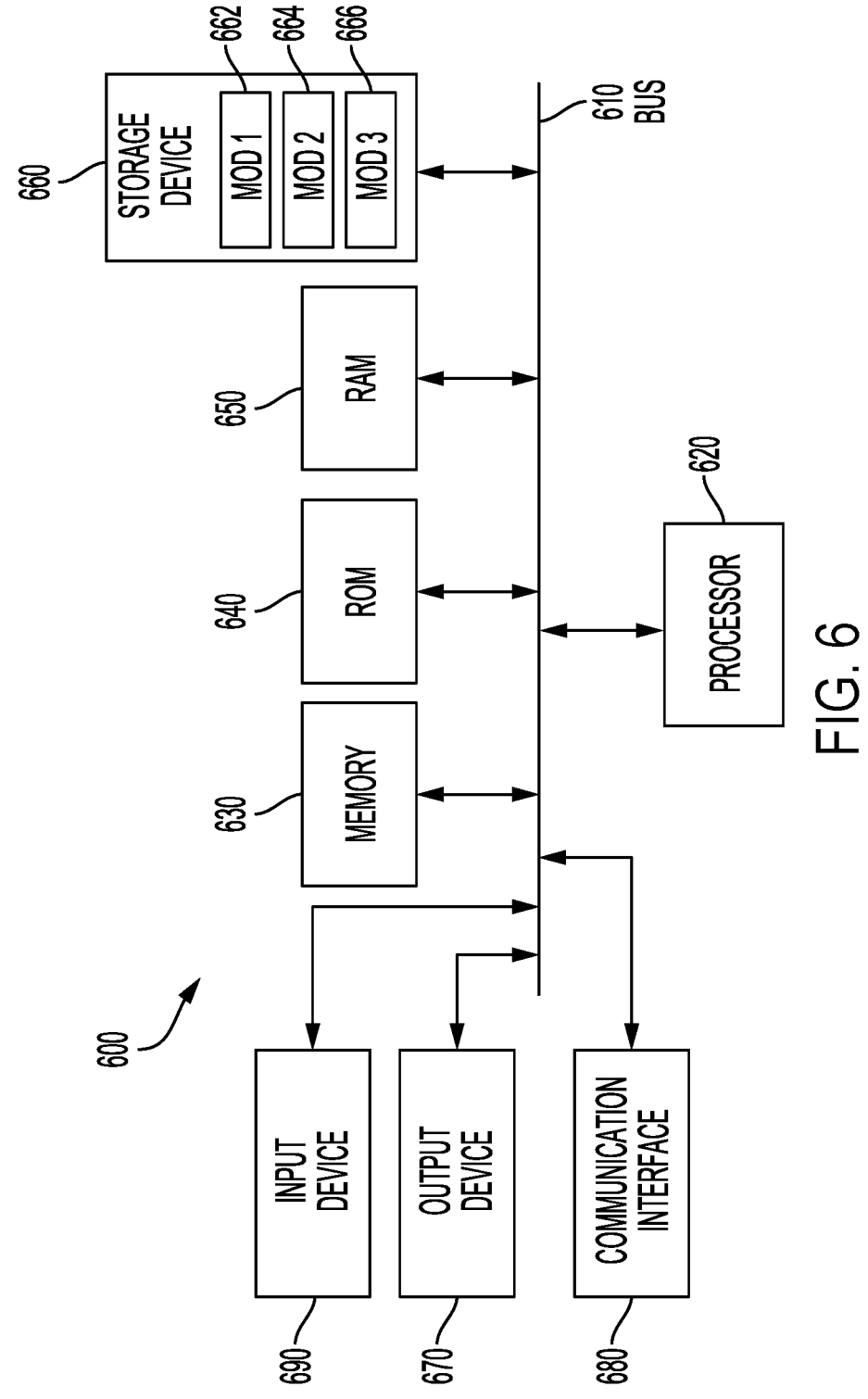
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:

receiving, at a processor aboard a tractor of an articulated vehicle, vehicle information associated with ongoing movement of the articulated vehicle;

receiving, at the processor, a driver optimization preference;

executing, via the processor based on the driver optimization preference, an Ackermann control algorithm, wherein inputs to the Ackermann control algorithm comprise:

the vehicle information; and at least one feedback item, the at least one feedback item indicating if a previous output of the Ackermann control algorithm was correct; and outputs of the Ackermann control algorithm comprise:

estimations of tire forces for each tire of the articulated vehicle; and estimations of cornering characteristics of the articulated vehicle;

calculating, via the processor based on vehicle sensor data of the articulated vehicle, a desired Ackermann geometry for the articulated vehicle; and transmitting, from the processor to at least one Ackermann geometry actuator of the articulated vehicle, a modification signal, the modification signal providing to the at least one Ackermann geometry actuator a command to modify a turning angle associated with at least one wheel of the articulated vehicle.

2. The method of claim 1, wherein the estimations of tire forces for each tire of the articulated vehicle further comprise:

estimations of front axle tire forces for each tire on a front axle of the articulated vehicle;

estimations of rear axle tire forces for each tire on a rear axle of the articulated vehicle; and estimations of intermediate axle tire forces for each tire on at least one axle of the articulated vehicle located between the front axle and the rear axle.

3. The method of claim 1, wherein:

the Ackermann control algorithm executed is one of a plurality of Ackermann control algorithms available for execution by the processor; and the method further comprises:

selecting the Ackermann control algorithm from the plurality of Ackermann control algorithms based on the driver optimization preference.

4. The method of claim 3, wherein the plurality of Ackermann control algorithms comprise:

a stability-focused algorithm;

a fuel efficiency-focused algorithm;

a tire wear-focused algorithm; and a balance of stability, fuel efficiency, and tire wear algorithm.

5. The method of claim 1, wherein the vehicle information comprises:

wheel speeds of the articulated vehicle;

a steering angle of the articulated vehicle;

load data of a front axle of the articulated vehicle;

load data of a rear axle of the articulated vehicle;

load data of each axle of the articulated vehicle located between the front axle and the rear axle;

lateral acceleration of the articulated vehicle; and a yaw rate of the articulated vehicle.

6. The method of claim 1, wherein the Ackermann control algorithm is generated by:

performing a sensitivity analysis which identifies correlations between known values of vehicle data associated with the vehicle information, known values of Ackermann geometry components, known driving cycles, and known vehicle applications;

forming, via a computing device, a neural network using the correlations; and converting, via the computing device, the neural network to computer executable code, resulting in the Ackermann control algorithm.

7. The method of claim 1, wherein the at least one feedback item comprises an indication of accuracy from a driver of the articulated vehicle regarding previous outputs of the Ackermann control algorithm.

8. The method of claim 1, wherein the modification signal modifies a first wheel to have a first turning angle and a second wheel to have a second turning angle, where the first turning angle is distinct from the second turning angle.

9. An articulated vehicle comprising:

a tractor vehicle;

a trailer vehicle;

at least one Ackermannn geometry actuator;

a processor; and a non-transitory computer-readable storage medium having instructions stored which, when executed by the processor, cause the processor to perform operations comprising:

receiving vehicle information associated with ongoing movement of the articulated vehicle;

receiving a driver optimization preference;

executing, based on the driver optimization preference, an Ackermann control algorithm, wherein:

inputs to the Ackermann control algorithm comprise:

the vehicle information; and at least one feedback item, the at least one feedback item indicating if a previous output of the Ackermann control algorithm was correct; and outputs of the Ackermann control algorithm comprise:

estimations of tire forces for each tire of the articulated vehicle; and estimations of cornering characteristics of the articulated vehicle;

calculating, based on vehicle sensor data of the articulated vehicle, a desired Ackermann geometry for the articulated vehicle; and transmitting, to the at least one Ackermann geometry actuator of the articulated vehicle, a modification signal, the modification signal providing to the at least one Ackermann geometry actuator a command to modify a turning angle associated with at least one wheel of the articulated vehicle.

10. The articulated vehicle of claim 9, wherein the estimations of tire forces for each tire of the articulated vehicle further comprise:

estimations of front axle tire forces for each tire on a front axle of the articulated vehicle;

estimations of rear axle tire forces for each tire on a rear axle of the articulated vehicle; and estimations of intermediate axle tire forces for each tire on at least one axle of the articulated vehicle located between the front axle and the rear axle.

11. The articulated vehicle of claim 9, wherein:

the Ackermann control algorithm executed is one of a plurality of Ackermann control algorithms available for execution by the processor; and the non-transitory computer-readable storage medium has additional instructions stored which, when executed by the processor, cause the processor to perform operations comprising:

selecting the Ackermann control algorithm from the plurality of Ackermann control algorithms based on the driver optimization preference.

12. The articulated vehicle of claim 11, wherein the plurality of Ackermann control algorithms comprise:

a stability-focused algorithm;

a fuel efficiency-focused algorithm;

a tire wear-focused algorithm; and a balance of stability, fuel efficiency, and tire wear algorithm.

13. The articulated vehicle of claim 9, wherein the vehicle information comprises: wheel speeds of the articulated vehicle;

a steering angle of the articulated vehicle;

load data of a front axle of the articulated vehicle;

load data of a rear axle of the articulated vehicle;

load data of each axle of the articulated vehicle located between the front axle and the rear axle;

lateral acceleration of the articulated vehicle; and a yaw rate of the articulated vehicle.

14. The articulated vehicle of claim 9, wherein the Ackermann control algorithm is generated by:

performing a sensitivity analysis which identifies correlations between known values of vehicle data associated with the vehicle information, known values of Ackermann geometry components, known driving cycles, and known vehicle applications;

forming, via a computing device, a neural network using the correlations; and converting, via the computing device, the neural network to computer executable code, resulting in the Ackermann control algorithm.

15. The articulated vehicle of claim 9, wherein the at least one feedback item comprises an indication of accuracy from a driver of the articulated vehicle regarding previous outputs of the Ackermann control algorithm.

16. The articulated vehicle of claim 9, wherein the modification signal modifies a first wheel to have a first turning angle and a second wheel to have a second turning angle, where the first turning angle is distinct from the second turning angle.

17. A non-transitory computer-readable storage medium stored within a tractor of an articulated vehicle, the non-transitory computer-readable storage medium having instructions which, when executed by a processor, cause the processor to perform operations comprising:

receiving vehicle information associated with ongoing movement of the articulated vehicle;

receiving a driver optimization preference;

executing, based on the driver optimization preference, an Ackermann control algorithm, wherein:

inputs to the Ackermann control algorithm comprise:

the vehicle information; and at least one feedback item, the at least one feedback item indicating if a previous output of the Ackermann control algorithm was correct; and outputs of the Ackermann control algorithm comprise:

estimations of tire forces for each tire of the articulated vehicle; and estimations of cornering characteristics of the articulated vehicle;

calculating, based on vehicle sensor data of the articulated vehicle, a desired Ackermann geometry for the articulated vehicle; and transmitting, to at least one Ackermann geometry actuator of the articulated vehicle, a modification signal, the modification signal providing to the at least one Ackermann geometry actuator a command to modify a turning angle associated with at least one wheel of the articulated vehicle.

18. The non-transitory computer-readable storage medium of claim 17, wherein the estimations of tire forces for each tire of the articulated vehicle further comprise:

estimations of front axle tire forces for each tire on a front axle of the articulated vehicle;

estimations of rear axle tire forces for each tire on a rear axle of the articulated vehicle; and estimations of intermediate axle tire forces for each tire on at least one axle of the articulated vehicle located between the front axle and the rear axle.

19. The non-transitory computer-readable storage medium of claim 17, wherein:

the Ackermann control algorithm executed is one of a plurality of Ackermann control algorithms available for execution by the processor; and the non-transitory computer-readable storage medium has additional instructions stored which, when executed by the processor, cause the processor to perform operations comprising:

selecting the Ackermann control algorithm from the plurality of Ackermann control algorithms based on the driver optimization preference.

20. The non-transitory computer-readable storage medium of claim 19, wherein the plurality of Ackermann control algorithms comprise:

a stability-focused algorithm;

a fuel efficiency-focused algorithm;

a tire wear-focused algorithm; and a balance of stability, fuel efficiency, and tire wear algorithm.

* * * * *